United States Patent
Miyazaki et al.

(10) Patent No.: US 9,484,565 B2
(45) Date of Patent: Nov. 1, 2016

(54) ENERGY STORAGE DEVICE

(71) Applicant: GS Yuasa International Ltd., Kyoto-shi, Kyoto (JP)

(72) Inventors: Akihiko Miyazaki, Kyoto (JP); Sumio Mori, Kyoto (JP); Tomonori Kako, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 473 days.

(21) Appl. No.: 13/855,029

(22) Filed: Apr. 2, 2013

(65) Prior Publication Data

US 2013/0266866 A1  Oct. 10, 2013

(30) Foreign Application Priority Data

Apr. 9, 2012  (JP) .................................. 2012-088343
Feb. 22, 2013  (JP) .................................. 2013-033297

(51) Int. Cl.
  *H01M 2/16* (2006.01)
  *H01M 4/485* (2010.01)
  *H01M 10/0525* (2010.01)

(52) U.S. Cl.
  CPC ......... *H01M 2/1686* (2013.01); *H01M 2/1646* (2013.01); *H01M 2/1653* (2013.01); *H01M 4/485* (2013.01); *H01M 10/0525* (2013.01); *Y02E 60/122* (2013.01); *Y02T 10/7011* (2013.01)

(58) Field of Classification Search
  CPC ....... H01M 2/16; H01M 2/14; H01M 2/1686
  USPC .................................................. 429/129–247
  See application file for complete search history.

(56) References Cited

U.S. PATENT DOCUMENTS

| | | | |
|---|---|---|---|
| 7,892,672 B2 | 2/2011 | Nishikawa | |
| 8,062,789 B2 | 11/2011 | Kim et al. | |
| 9,293,752 B2 | 3/2016 | Murata et al. | |
| 2006/0222936 A1* | 10/2006 | Yamaguchi et al. | 429/145 |
| 2006/0263693 A1 | 11/2006 | Kim et al. | |
| 2010/0009265 A1* | 1/2010 | Hatayama et al. | 429/254 |
| 2010/0143802 A1 | 6/2010 | Takei | |

(Continued)

FOREIGN PATENT DOCUMENTS

| | | |
|---|---|---|
| EP | 2124271 | 11/2009 |
| EP | 2169742 | 3/2010 |

(Continued)

OTHER PUBLICATIONS

Extended European Search Report dated Aug. 28, 2013 filed in the corresponding patent application No. 13162414.0.

*Primary Examiner* — James Lee
(74) *Attorney, Agent, or Firm* — Rankin, Hill & Clark LLP

(57) ABSTRACT

In an energy storage device including a positive electrode plate and a negative electrode plate that are insulated from each other with a separator interposed therebetween, and a non-aqueous electrolyte, the separator includes a base material layer and a coating layer that is disposed on at least one surface of the base material layer, and the separator has an air permeability of the base material layer of 25 (sec/100 cc) or greater and 250 (sec/100 cc) or less, a porosity of the base material layer of 45% or greater, an air permeability of an interface between the base material layer and the coating layer of 15 (sec/100 cc) or less, and an air permeability of the coating layer of 15 (sec/100 cc) or less.

11 Claims, 5 Drawing Sheets

(56) References Cited

U.S. PATENT DOCUMENTS

| | | |
|---|---|---|
| 2010/0178544 A1 | 7/2010 | Nishikawa |
| 2010/0255362 A1* | 10/2010 | Ogawa et al. ............... 429/145 |
| 2010/0285348 A1 | 11/2010 | Murata et al. |
| 2011/0293976 A1 | 12/2011 | Chiba et al. |
| 2014/0302389 A1* | 10/2014 | Hasegawa ........... H01M 2/1646 429/209 |

FOREIGN PATENT DOCUMENTS

| | | |
|---|---|---|
| EP | 2333876 | 6/2011 |
| JP | 11-158304 | 6/1999 |
| JP | 2005-063731 | 3/2005 |
| JP | 2007-125821 | 5/2007 |
| JP | 2008-010337 | 1/2008 |
| JP | 2008-186721 | 8/2008 |
| JP | 2009-283273 | 12/2009 |
| JP | 2010-102868 | 5/2010 |
| JP | 2010-123465 | 6/2010 |
| JP | 2010-176901 | 8/2010 |
| JP | 4516544 | 8/2010 |
| JP | 2010-245028 | 10/2010 |
| JP | 2011-138761 | 7/2011 |
| JP | 2011-258462 | 12/2011 |
| WO | 2006/068428 | 6/2006 |
| WO | 2008/149895 | 12/2008 |

* cited by examiner

ENERGY STORAGE DEVICE

CROSS REFERENCE TO RELATED APPLICATIONS

The present application is based on and claims priority of Japanese Patent Application No. 2012-88343 filed on Apr. 9, 2012 and Japanese Patent Application No. 2013-33297 filed on Feb. 22, 2013. The entire disclosure of the above-identified application, including the specification, drawings and claims is incorporated herein by reference in its entirety.

FIELD

The present invention relates to an energy storage device including a positive electrode and a negative electrode that are insulated from each other with a separator interposed therebetween, and a non-aqueous electrolyte.

BACKGROUND

The shift from gasoline vehicles to electric vehicles is increasingly important as measures for global environmental issues. For this reason, development of electric vehicles that use energy storage devices such as lithium ion secondary batteries as power sources is underway. Some of the energy storage devices include a separator of multilayer structure having a heat resistant coating layer or the like in order to ensure heat resistance of the separator.

Conventionally, energy storage devices have been proposed that include a multilayer structured separator capable of improving safety while suppressing reduction in battery performance (see, for example, Patent Document 1: Japanese Unexamined Patent Application Publication No. 2009-283273). In such an energy storage device, with the difference in air permeability of a plurality of layers constituting the separator satisfying a predetermined condition, safety can be improved while reduction in battery performance is suppressed.

SUMMARY

It is an object of the present invention to provide an energy storage device that includes a multilayer structured separator and that is capable of significantly improving transient degradation of output.

In order to achieve the above object, an energy storage device according to one aspect of the present invention is an energy storage device including a positive electrode and a negative electrode that are insulated from each other with a separator interposed therebetween, and a non-aqueous electrolyte, wherein the separator includes a base material layer and a coating layer that is disposed on at least one surface of the base material layer, and the separator has an air permeability of the base material layer of 25 (sec/100 cc) or greater and 250 (sec/100 cc) or less, a porosity of the base material layer of 45% or greater, an air permeability of an interface between the base material layer and the coating layer of 15 (sec/100 cc) or less, and an air permeability of the coating layer of 15 (sec/100 cc) or less.

BRIEF DESCRIPTION OF DRAWINGS

These and other objects, advantages and features of the invention will become apparent from the following description thereof taken in conjunction with the accompanying drawings that illustrate a specific embodiment of the present invention.

DESCRIPTION OF EMBODIMENTS

Figure 1:
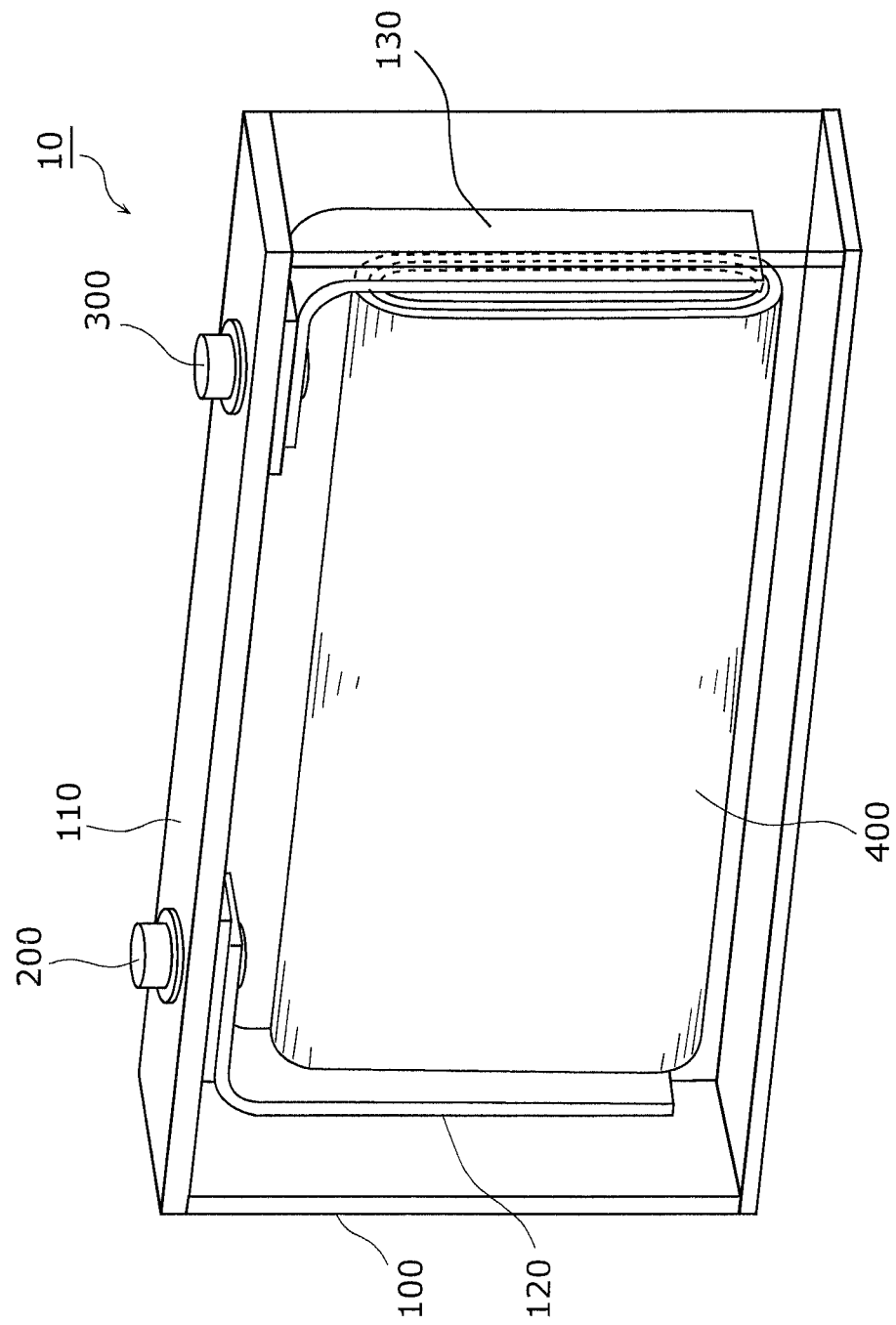
FIG. 1 is an external perspective view of an energy storage device according to an embodiment of the present invention.

In the conventional energy storage device including a multilayer structured separator described above, a situation can occur in which when the energy storage device is charged and discharged, the output temporarily drops. Particularly when the energy storage device is repeatedly charged and discharged at high-rate cycles, the output may temporarily drop significantly. Such a temporary drop in the output (hereinafter, referred to as "transient output degradation") can be improved by switching the charge and discharge of the energy storage device to charge and discharge at low-rate cycles or by not performing charge and discharge for a predetermined period of time, but it is necessary to change the operation condition to an operation condition other than the charge and discharge at high-rate cycles.

Meanwhile, the reduction of the output before charge and discharge are performed can be suppressed by reducing the overall air permeability of the multilayer structured separator, but it was difficult to suppress the transient output degradation during high-rate cycles.

The present invention has been made to solve the above problems, and it is an object of the present invention to provide an energy storage device that includes a multilayer structured separator and that is capable of significantly improving the transient output degradation.

In order to achieve the above object, an energy storage device according to one aspect of the present invention is an energy storage device including a positive electrode and a negative electrode that are insulated from each other with a separator interposed therebetween, and a non-aqueous electrolyte, wherein the separator includes a base material layer and a coating layer that is disposed on at least one surface of the base material layer, and the separator has an air permeability of the base material layer of 25 (sec/100 cc) or greater and 250 (sec/100 cc) or less, a porosity of the base material layer of 45% or greater, an air permeability of an interface between the base material layer and the coating layer of 15 (sec/100 cc) or less, and an air permeability of the coating layer of 15 (sec/100 cc) or less.

According to this configuration, the energy storage device includes a separator having a base material layer and a coating layer, wherein the separator has an air permeability of the base material layer of 25 (sec/100 cc) or greater and 250 (sec/100 cc) or less, a porosity of the base material layer of 45% or greater, an air permeability of an interface between the base material layer and the coating layer of 15

(sec/100 cc) or less, and an air permeability of the coating layer of 15 (sec/100 cc) or less. In other words, the present inventors found, as a result of intensive research, that in order to significantly improve the transient output degradation of an energy storage device including a separator having a base material layer and a coating layer, it is necessary to reduce the air permeabilities of the base material layer and the coating layer, and at the same time it is necessary to reduce the air permeability of the interface between these two layers, as well as increasing the porosity of the base material layer. Specifically, the present inventors found, as a result of intensive experiments, that when the air permeability of the base material layer is 25 (sec/100 cc) or greater and 250 (sec/100 cc) or less, the porosity of the base material layer is 45% or greater, the air permeability of the interface between the base material layer and the coating layer is 15 (sec/100 cc) or less, and the air permeability of the coating layer is 15 (sec/100 cc) or less, partial inhibition of ion migration is unlikely to occur, and the transient output degradation in the energy storage device can be improved significantly. Therefore, with the energy storage device including the multilayer structured separator, the transient output degradation can be improved significantly.

Also, preferably, the separator has an air permeability of the base material layer of 35 (sec/100 cc) or greater.

Here, the present inventors found, as a result of intensive research, that in the energy storage device, when the base material layer has an air permeability of 35 (sec/100 cc) or greater, the occurrence of a micro-short circuit can be suppressed. Therefore, with the energy storage device, the transient output degradation can be improved significantly while the occurrence of a micro-short circuit is suppressed.

Also, preferably, the positive electrode includes, as a positive electrode active material, a compound represented by $Li_aNi_bM1_cM2_dW_xNb_yZr_zO_2$ (where a, b, c, d, x, y, and z satisfy $0 \leq a \leq 1.2$, $0 \leq b \leq 1$, $0 \leq c \leq 0.5$, $0 \leq d \leq 0.5$, $0 \leq x \leq 0.1$, $0 \leq y \leq 0.1$, $0 \leq z \leq 0.1$, and $b+c+d=1$; and M1 and M2 are each at least one element selected from the group consisting of Mn, Ti, Cr, Fe, Co, Cu, Zn, Al, Ge, Sn, Mg, and Zr, and satisfy M1≠M2), and the negative electrode includes hard carbon as a negative electrode active material.

According to this configuration, the energy storage device includes as a positive electrode active material, a compound represented by $Li_aNi_bM1_cM2_dW_xNb_yZr_zO_2$ that satisfies a predetermined condition, and hard carbon as a negative electrode active material. Here, as a result of intensive research and experiments, the present inventors succeeded in significantly increasing capacity and output by using the above positive electrode active material, the above negative electrode active material, and a multilayer structured separator, but also found a problem in that the degree of transient output degradation after high-rate cycles becomes more apparent. And, as a result of further research, they found that by using the above positive electrode active material, the above negative electrode active material, and a separator having an air permeability and a porosity that are within the above ranges, the output can be increased significantly and the transient output degradation after high-rate cycles can be improved more noticeably. Therefore, with the use of the energy storage device including such a multilayer structured separator, it is possible to increase the output significantly and improve the transient output degradation more noticeably.

Also, preferably, the coating layer is a heat resistant coating layer containing, as heat resistant particles, at least either one of inorganic particles and resin particles.

According to this configuration, the coating layer is a heat resistant coating layer containing, as heat resistant particles, at least either one of inorganic particles and resin particles. Accordingly, even when the energy storage device is placed in a high temperature environment, in the energy storage device, insulation between the positive electrode and the negative electrode can be ensured.

Also, preferably, in the coating layer, a proportion of the heat resistant particles is substantially the same between a base material layer-side half and a surface-side half.

According to this configuration, in the coating layer, the proportion of the heat resistant particles is substantially the same between the base material layer-side half and the surface-side half. In other words, the heat resistant particles are uniformly distributed in the coating layer, and thus the air permeability of the coating layer becomes uniform, and the partial inhibition of ion migration is less likely to occur, as a result of which the transient output degradation can be effectively improved. Therefore, in the energy storage device including a separator having such a coating layer, the transient output degradation can be improved significantly.

Also, preferably, the separator has an air permeability of the coating layer of 1 (sec/100 cc) or greater.

This is because a separator having an air permeability of the coating layer of less than 1 (sec/100 cc) has a reduced strength against physical scratching or the like of the coating layer, as compared with a separator having an air permeability of the coating layer of 1 (sec/100 cc) or greater.

Also, preferably, the separator has an air permeability of the interface of 1 (sec/100 cc) or greater.

This is because in a separator having an air permeability of the interface of less than 1 (sec/100 cc), adhesion between the base material layer and the coating layer is partially reduced, as compared with a separator having an air permeability of the interface of 1 (sec/100 cc) or greater.

Note that the present invention can be embodied not only as an energy storage device as described above, but also as a separator included in the energy storage device.

Hereinafter, an energy storage device according to an embodiment of the present invention will be described with reference to the drawings. The embodiment described below shows a preferable specific example of the present invention. The numerical values, shapes, materials, structural elements, the arrangement and connection of the structural elements, etc. shown in the following embodiment are merely examples, and therefore do not limit the scope of the claims. The present invention is limited only by the appended claims. Therefore, among the structural elements in the following embodiment, structural elements not recited in any one of the independent claims that indicate the broadest concepts of the invention are not necessarily required to achieve the object of the present invention, but are described as structural elements that constitute a preferable embodiment.

A configuration of an energy storage device 10 will be described first.

FIG. 1 is an external perspective view of an energy storage device 10 according to an embodiment of the present invention. This diagram is a see-through view showing the inside of a container.

The energy storage device 10 is a secondary battery capable of charging and discharging electricity. More specifically, the energy storage device 10 is a non-aqueous electrolyte secondary battery such as a lithium ion secondary battery. For example, the energy storage device 10 is a secondary battery for use in a hybrid electric vehicle that performs charge and discharge at high-rate cycles.

As shown in the diagram, the energy storage device 10 includes a container 100, a positive electrode terminal 200, and a negative electrode terminal 300. The container 100 includes a cover plate 110 that serves as an upper wall. Also, inside the container 100, an electrode assembly 400, a positive electrode current collector 120, and a negative electrode current collector 130 are disposed.

A liquid such as an electrolyte is sealed within the container 100 of the energy storage device 10, but the liquid is not illustrated in the diagram. Also, the energy storage device 10 is not limited to a non-aqueous electrolyte secondary battery, and may be a secondary battery other than a non-aqueous electrolyte secondary battery, or may be a capacitor.

The container 100 is made up of a bottomed housing body that has a rectangular cylindrical shape and is made of metal, and the cover plate 110 that is made of metal and closes an opening of the housing body. Also, the container 100 is configured so as to be capable of hermetically sealing the inside thereof by the cover plate 110 and the housing body being welded or the like after the electrode assembly 400 and the like are accommodated therein.

The electrode assembly 400 is a member that includes a positive electrode, a negative electrode and a separator and is capable of storing electricity. Specifically, the electrode assembly 400 is formed by winding a laminate such that the whole has an oblong shape, the laminate including a negative electrode and a positive electrode that are disposed in layers so as to sandwich a separator. In the diagram, the electrode assembly 400 having an oblong shape is illustrated, but the electrode assembly 400 may have a circular shape or an elliptical shape. The design of the electrode assembly 400 is not limited to the wound design, and may be the design in which flat electrode plates are laminated. A detailed configuration of the electrode assembly 400 will be described later.

The positive electrode terminal 200 is an electrode terminal that is electrically connected to the positive electrode of the electrode assembly 400, and the negative electrode terminal 300 is an electrode terminal that is electrically connected to the negative electrode of the electrode assembly 400. That is, the positive electrode terminal 200 and the negative electrode terminal 300 are electrode terminals that are made of metal and that are for drawing out electricity stored in the electrode assembly 400 to an external space of the energy storage device 10 and introducing electricity into an internal space of the energy storage device 10 to store the electricity in the electrode assembly 400. Also, the positive electrode terminal 200 and the negative electrode terminal 300 are attached to the cover plate 110 that is disposed above the electrode assembly 400.

The positive electrode current collector 120 is a conductive and rigid member that is disposed between the positive electrode of the electrode assembly 400 and the side wall of the container 100 and electrically connected to the positive electrode terminal 200 and the positive electrode of the electrode assembly 400. The positive electrode current collector 120 is made of aluminum, as is the positive electrode of the electrode assembly 400.

The negative electrode current collector 130 is a conductive and rigid member that is disposed between the negative electrode of the electrode assembly 400 and the side wall of the container 100 and electrically connected to the negative electrode terminal 300 and the negative electrode of the electrode assembly 400. The negative electrode current collector 130 is made of copper, as is the negative electrode of the electrode assembly 400.

There is no particular limitation on the type of non-aqueous electrolyte that is sealed within the container 100 as long as the battery performance is not impaired, and various types of non-aqueous electrolytes can be selected. Examples of organic solvents for the non-aqueous electrolyte include ethylene carbonate, propylene carbonate, butylene carbonate, trifluoropropylene carbonate, γ-butyrolactone, γ-valerolactone, sulfolane, 1,2-dimethoxyethane, 1,2-diethoxyethane, tetrahydrofuran, 2-methyltetrahydrofuran, 2-methyl-1,3-dioxolane, dioxolane, fluoroethyl methyl ether, ethylene glycol diacetate, propylene glycol diacetate, ethylene glycol dipropionate, propylene glycol dipropionate, methyl acetate, ethyl acetate, propyl acetate, butyl acetate, methyl propionate, ethyl propionate, propyl propionate, dimethyl carbonate, diethyl carbonate, ethyl methyl carbonate, methyl propyl carbonate, ethyl propyl carbonate, dipropyl carbonate, methyl isopropyl carbonate, ethyl isopropyl carbonate, diisopropyl carbonate, dibutyl carbonate, acetonitrile, fluoroacetonitrile, alkoxy- and halogen-substituted cyclic phosphazenes or linear phosphazenes such as ethoxypentafluorocyclotriphosphazene, diethoxytetrafluorocyclotriphosphazene, and phenoxypentafluorocyclotriphosphazene, phosphoric acid esters such as triethyl phosphate, trimethyl phosphate, and trioctyl phosphate, boric acid esters such as triethyl borate and tributyl borate, and non-aqueous solvents such as N-methyloxazolidinone and N-ethyloxazolidinone. In the case where a solid electrolyte is used, it is sufficient that a porous polymer solid electrolyte membrane is used as a polymer solid electrolyte and an electrolyte is further contained in the polymer solid electrolyte. Also, in the case where a gel polymer solid electrolyte is used, the electrolyte constituting the gel and the electrolyte contained in the pores may be different. However, in the case where a high output is required such as HEV applications, it is more preferable to use a non-aqueous electrolyte alone as an electrolyte rather than using a solid electrolyte or a polymer solid electrolyte.

There is no particular limitation on the non-aqueous electrolyte salt, and examples include ionic compounds such as $LiClO_4$, $LiBF_4$, $LiAsF_6$, $LiPF_6$, $LiCF_3SO_3$, $LiN(SO_2CF_3)_2$, $LiN(SO_2C_2F_5)_2$, $LiN(SO_2CF_3)(SO_2C_4F_9)$, LiSCN, LiBr, LiI, $Li_2SO_4$, $Li_2B_{10}Cl_{10}$, $NaClO_4$, NaI, NaSCN, NaBr, $KClO_4$, and KSCN; and mixtures of two or more thereof.

In the energy storage device 10, the organic solvents and non-aqueous electrolyte salt listed above are combined and used as non-aqueous electrolytes. Among the non-aqueous electrolytes, a mixed use of ethylene carbonate, dimethyl carbonate, and methyl ethyl carbonate is preferable because a maximum lithium ion conductivity is obtained.

A detailed configuration of the electrode assembly 400 will be described next.

Figure 2:
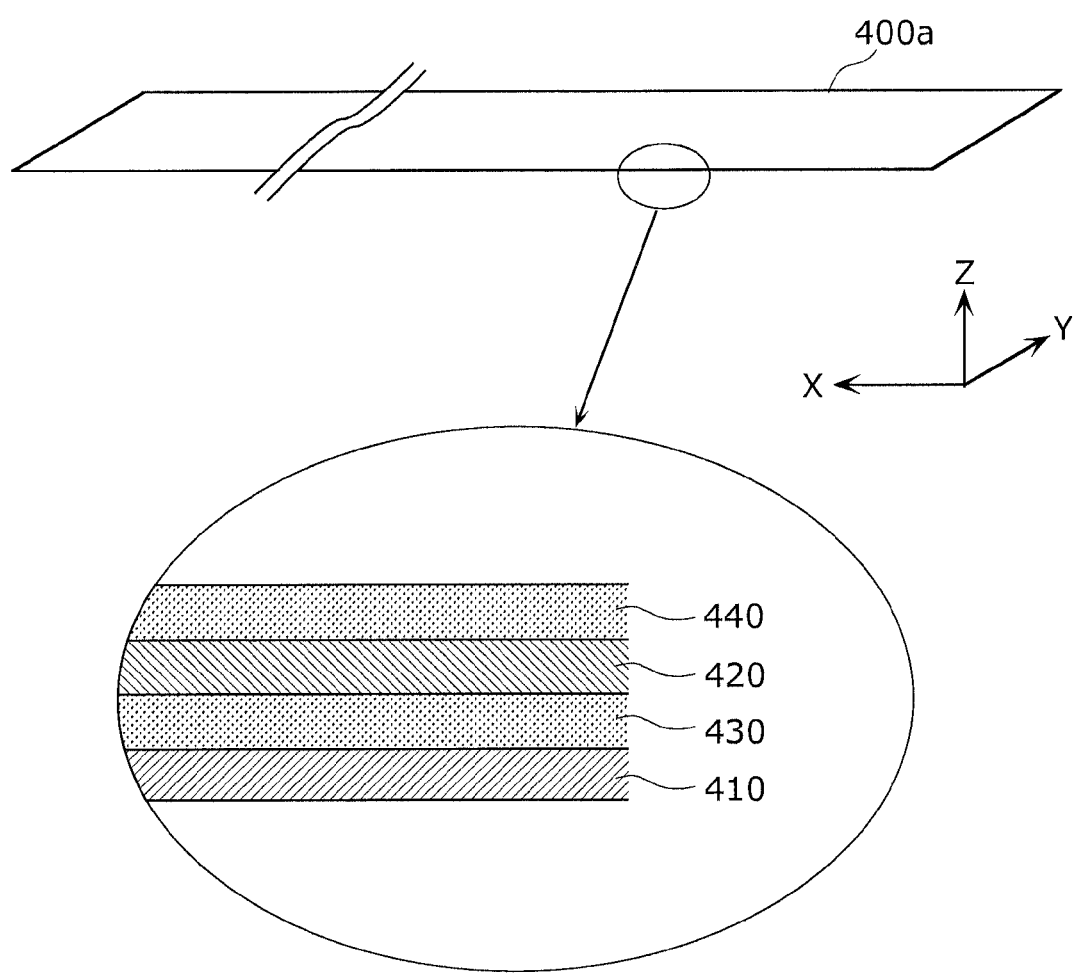
FIG. 2 is a diagram illustrating a configuration of an electrode assembly according to an embodiment of the present invention.

FIG. 2 is a diagram illustrating a configuration of the electrode assembly 400 according to an embodiment of the present invention. Specifically, FIG. 2 is a diagram showing the electrode assembly 400a before it is wound as shown in FIG. 1.

As shown in the diagram, the electrode assembly 400a includes a positive electrode plate 410, a negative electrode plate 420 and two separators 430 and 440.

The positive electrode plate 410 includes an elongated strip-shaped positive electrode current collector sheet made of aluminum and a positive electrode active material layer formed on the surface of the positive electrode current collector sheet. The positive electrode plate 410 used in the energy storage device 10 according to the present invention is the same as the conventionally used positive electrode plates, and thus ordinary positive electrode plates can be used.

As the positive electrode active material, for example, polyanionic compounds such as $LiMPO_4$, $LiMSiO_4$, and $LiMBO_3$ (where M is one or more transition metal elements selected from Fe, Ni, Mn, Co and the like), spinel compounds such as lithium titanate and lithium manganate, lithium transition metal oxides such as $LiMO_2$ (where M is one or more transition metal elements selected from Fe, Ni, Mn, Co and the like) can be used.

In the present embodiment, the positive electrode active material preferably includes a compound represented by $Li_aNi_bM1_cM2_dW_xNb_yZr_zO_2$, where a, b, c, d, x, y, and z satisfy $0 \leq a \leq 1.2$, $0 \leq b \leq 1$, $0 \leq c \leq 0.5$, $0 \leq d \leq 0.5$, $0 \leq x \leq 0.1$, $0 \leq y \leq 0.1$, $0 \leq z \leq 0.1$, and $b+c+d=1$; and M1 and M2 are each at least one element selected from the group consisting of Mn, Ti, Cr, Fe, Co, Cu, Zn, Al, Ge, Sn, Mg, and Zr, and satisfy M1≠M2.

The negative electrode plate 420 includes an elongated strip-shaped negative electrode current collector sheet made of copper and a negative electrode active material layer formed on the surface of the negative electrode current collector sheet. The negative electrode plate 420 used in the energy storage device 10 according to the present invention is the same as the conventionally used negative electrode plates, and thus ordinary negative electrode plates can be used.

As the negative electrode active material, for example, a known negative electrode active material can be used as appropriate, as long as the material is capable of absorbing and desorbing lithium ions. Examples include lithium metals, lithium alloys (lithium metal-containing alloys such as lithium-aluminum, lithium-lead, lithium-tin, lithium-aluminum-tin, lithium-gallium, and Wood's alloy). Other examples include alloys capable of absorbing and desorbing lithium, carbon materials (for example, graphite, non-graphitizable carbon, graphitizable carbon, low-temperature baked carbon, amorphous carbon, and the like), metal oxides, lithium metal oxides ($Li_4Ti_6O_{12}$, and the like), and polyphosphate compounds.

In the present embodiment, it is preferable that the negative electrode includes hard carbon as a negative electrode active material.

The separator 430 is an elongated strip-shaped separator that is disposed between the positive electrode plate 410 and the negative electrode plate 420. A configuration of the separator 430 will be described in detail below.

Figure 3:
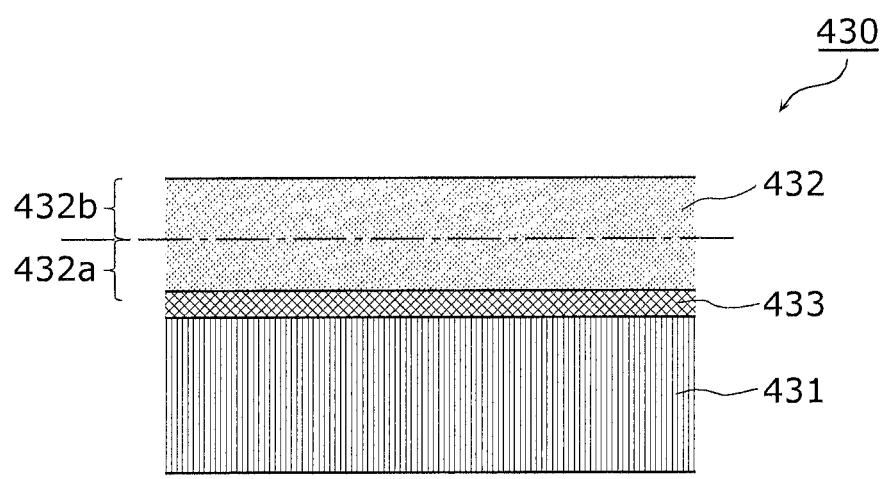
FIG. 3 is a diagram illustrating a configuration of a separator according to an embodiment of the present invention.

FIG. 3 is a diagram illustrating a configuration of the separator 430 according to an embodiment of the present invention.

As shown in the diagram, the separator 430 includes a base material layer 431 and a coating layer 432.

The base material layer 431 is the main body of the separator 430, and is a microporous sheet having an air permeability of 250 (sec/100 cc) or less and a porosity of 45% or greater. The methods for measuring the air permeability and porosity of the base material layer 431 will be described later.

Specifically, as the base material layer 431, a resin porous film having polymer fibers, natural fibers, hydrocarbon fibers, glass fibers or ceramic fibers that are woven or non-woven is used. The resin porous film preferably includes woven or non-woven polymer fibers. In particular, it is preferable that the resin porous film includes a polymer fabric or fleece, or the resin porous film is a similar fabric or fleece. The polymer fiber is preferably a non-conductive polymer fiber selected from polyacrylonitrile (PAN), polyamide (PA), polyesters such as polyethylene terephthalate (PET) and/or polyolefins (PO) such as polypropylene (PP) and polyethylene (PE), and mixtures of similar polyolefins. The resin porous film may be a polyolefin microporous membrane, a non-woven fabric, paper or the like, and preferably a polyolefin microporous membrane. As the porous polyolefin layer, polyethylene, polypropylene, or a composite film thereof can be used. The base material layer 431 preferably has a thickness of approximately 5 to 30 µm in consideration of the influence on battery characteristics.

The base material layer 431 preferably has a porosity of 80% or less because an excessively large porosity negatively affects heat shrinkage properties and shutdown characteristics.

The coating layer 432 is a layer that is placed on at least one surface of the base material layer 431 so as to coat the base material layer 431. In the diagram, the coating layer 432 coats the upper surface of the base material layer 431, but the coating layer 432 may coat the lower surface of the base material layer 431 or both surfaces of the same. The coating layer 432 has an air permeability of 15 (sec/100 cc) or less. The method for measuring the air permeability of the coating layer 432 will be described later.

Specifically, the coating layer 432 is a heat resistant coating layer containing, as heat resistant particles, at least either one of heat resistant inorganic particles and resin particles. In the coating layer 432, it is preferable that the proportion of the heat resistant particles is substantially the same between a base material layer-side half 432a and a surface-side half 432b. The proportion of the heat resistant particles can be measured by observing a vertical cross section of the coating layer 432 with a scanning electron microscope (SEM).

Specifically, the above-described inorganic particles are composed of one or more inorganic substances selected from the following, or a mixture or composite compound thereof. Examples of the inorganic substances include oxides such as iron oxide, $SiO_2$, $Al_2O_3$, $TiO_2$, $BaTiO_2$, $ZrO$ and alumina-silica composite oxide; nitride fine particles such as aluminum nitride and silicon nitride; poorly soluble ionic crystal fine particles such as calcium fluoride, barium fluoride and barium sulfate; covalent crystal fine particles such as silicon and diamond; clay fine particles such as talc and montmorillonite; mineral resource-derived materials such as boehmite, zeolite, apatite, kaoline, mullite, spinel, olivine, sericite, bentonite and mica, and artificial materials thereof. The above-described inorganic substances may be fine particles to which electric insulation is imparted by surface-treating the surface of conductive fine particles with an electrically insulating material (for example, a material constituting the electrically insulating inorganic particles described above), examples of the conductive fine particles including oxide fine particles such as $SnO_2$ and indium-tin oxide (ITO) and carbonaceous fine particles such as carbon black and graphite.

In the present embodiment, it is preferable that the inorganic particles are composed of $SiO_2$, $Al_2O_3$ or an alumina-silica composite oxide.

There is no particular limitation on the resin particles as long as they are made of a material having a softening point higher than that of the constituent materials of the base material layer 431. Examples include polyimide, polyamide, polyamide imide, melamine-based resin, phenol-based resin, crosslinked polymers such as crosslinked polymethyl methacrylate (crosslinked PMMA), crosslinked polystyrene (crosslinked PS), polydivinylbenzene (PDVB) and benzoguanamine-formaldehyde condensation products, and heat resistant polymers such as thermoplastic polyimide. These organic resins (polymers) may be mixtures, modified forms, derivatives, copolymers (random copolymer, alternating copolymer, block copolymer, graft copolymer) or cross-linked forms (in the case of the above-described heat resistant polymers) of the above-listed materials.

Also, it is desirable that the coating layer 432 is formed by applying, onto the base material layer 431, a solution obtained by dispersing heat resistant particles and a binder in a solvent. Examples of the binder include polyacrylonitrile, polyvinylidene fluoride, a copolymer of vinylidene fluoride and hexafluoropropylene, polytetrafluoroethylene, polyhexafluoropropylene, polyethylene oxide, polypropylene oxide, polyphosphazene, polysiloxane, polyvinyl acetate, polyvinyl alcohol, polymethyl methacrylate, polyacrylic acid, polymethacrylic acid, styrene-butadiene rubber, nitrile-butadiene rubber, polystyrene and polycarbonate. In particular, from the viewpoint of electrochemical stability, polyacrylonitrile, polyvinylidene fluoride, polyhexafluoropropylene or polyethylene oxide is preferable.

The binder used in this embodiment is preferably polyvinylidene fluoride (PVDF), polyacrylic acid, polymethacrylic acid or styrene-butadiene rubber.

Referring back to FIG. 2, the separator 440 is an elongated strip-shaped separator that is disposed on the negative electrode plate 420. The separator 440 has the same configuration as that of the separator 430, and thus a detailed description thereof is omitted here.

Then, the positive electrode plate 410, the separator 430, the negative electrode plate 420 and the separator 440 are wound in a lengthwise direction (X-axis direction shown in FIG. 2) so as to form a plurality of laminated layers, whereby the electrode assembly 400 shown in FIG. 1 is formed. Through this process, the separator 440 is also disposed between the positive electrode plate 410 and the negative electrode plate 420.

Hereinafter, a significant improvement in the transient output degradation achieved by the energy storage device 10 including the separator 440 will be described in detail.

EXAMPLES

A method for manufacturing the energy storage device 10 will be described first. Specifically, batteries were produced in the following manner as energy storage devices of Examples 1 to 14 and Comparative Examples 1 to 8, which will be described later. Note that Examples 1 to 14 are all relate to energy storage devices 10 according to the embodiment described above.

(1-1) Production of Positive Electrode Plate

As a positive electrode active material, $LiCoO_2$ having an average particle size d50 of 4 μm was used in Examples 1 to 11, 13 and 14 and Comparative Examples 1 to 6 and 8, and $LiNi_{1/3}Mn_{1/3}Co_{1/3}O_2$ having an average particles size d50 of 4 μm was used in Example 12 and Comparative Example 7. Also, acetylene black was used as a conductivity enhancing agent, and PVDF was used as a binder. The positive electrode active material, the conductivity enhancing agent and the binder were blended in amounts of 90 mass %, 5 mass % and 5 mass %, respectively. As a foil, an aluminum foil having a thickness of 20 μm was used. N-methyl-2-pyrrolidone (NMP) was added to the positive electrode active material, the conductivity enhancing agent and the binder, and the mixture was kneaded and applied onto the foil, and the foil was dried and pressed.

(1-2) Production of Negative Electrode Plate

As a negative electrode active material, graphite having an average particle size d50 of 10 μm was used in Examples 1 to 11, 13 and 14 and Comparative Examples 1 to 6 and 8, and hard carbon having an average particle size d50 of 10 μm was used in Example 12 and Comparative Example 7. Also, PVDF was used as a binder. The negative electrode active material and the binder were blended in amounts of 95 mass % and 5 mass %, respectively. As a foil, a copper foil having a thickness of 15 μm was used. NMP was added to the negative electrode active material, a conductivity enhancing agent and the binder, and the mixture was kneaded and applied onto the foil, and the foil was dried and pressed. The average particle size of the positive electrode active material and the negative electrode active material was measured using a particle size distribution measurement apparatus Shimadzu SALD-2200 (Wing SALD II: Version 2.1.0).

(1-3) Production of Separator

As base material layers, 20 μm-thick microporous membranes composed mainly of polyethylene and having base material layer air permeabilities of Examples 1 to 14 and Comparative Examples 1 to 8 listed in Table 1 were used. Inorganic particles (alumina particles), a binder (SBR), a thickener (CMC), a solvent (ion exchanged water) and a surfactant were mixed such that the ratio of alumina particles to binder was 97:3, so as to produce a coating material. Then, the coating material was applied onto a base material layer by a gravure method so as to coat the base material layer, which was then dried at 80° C. for 12 hours so as to form a coating layer having an inorganic coating thickness of 5 μm. Here, the ratios and solid ratios of the binder, the thickener and the surfactant were finely adjusted so as to change the coating material, or alternatively, the surface of the base material layer was reformed so as to change the coating layer air permeability and the interface air permeability, whereby separators of Examples 1 to 14 and Comparative Examples 1 to 8 were produced.

(1-4) Production of Electrolyte

An electrolyte was prepared by adding 1 mol/L of $LiPF_6$ to a solvent mixture of propylene carbonate (PC), dimethyl carbonate (DMC), and ethyl methyl carbonate (EMC) mixed at a ratio (volume ratio) of 3:2:5.

(1-5) Production of Battery

A positive electrode, a negative electrode, and a separator were wound such that the coating layer of the separator was opposed to the positive electrode. In this manner, a battery was produced.

Next, battery evaluation tests (in each test, the average of three instances was used) were performed in the following manner.

(2-1) Output Test

Evaluation tests were performed in the following manner by using each of the batteries of Examples 1 to 14 and Comparative Examples 1 to 8. First, SOC (state of charge) was adjusted to 50% at 25° C. with 0.5 C for 1 hour, with the current capacity discharged in a discharge test performed immediately before at 25° C. at 4 A (upper limit: 4.1 V, lower limit: 2.4 V) being set to 1 C. The discharge was carried out at a temperature of 25° C. and with a current of 30 C. Then, resistance D1 was calculated by the following expression: resistance D1=(difference between voltage after 10 seconds and voltage before energization)/current, and battery output W1 was calculated by the following expression: battery output W1=(voltage before energization−lower limit voltage)/resistance×lower limit voltage.

(2-2) Test for Low-Rate Transient Output Degradation

Resistance before the battery was cycled was obtained in the same manner as the output test described above. Then, a cycle, in which the battery with a SOC of 50% was subjected to a 30-second continuous discharge and a 30-second continuous charge carried out within 2 minutes with a current of 1 C, was continuously performed 1000 times. Then, an output test was carried out within 2 hours after completion of the cycles so as to calculate resistance D2. In this manner, low-rate transient degradation R2=D2/D1 was calculated, which indicates a transient output degradation at low-rate cycles.

(2-3) Test for High-Rate Transient Output Degradation

Resistance before the battery was cycled was obtained in the same manner as the output test described above. Then, a cycle, in which the battery with a SOC of 50% was subjected to a 30-second continuous discharge and a 30-second continuous charge carried out within 2 minutes with a current of 10 C, was continuously performed 1000 times. Then, an output test was carried out within 2 hours after completion of the cycles so as to calculate resistance D3. In this manner, high-rate transient degradation R3=D3/D1 was calculated, which indicates a transient output degradation at high-rate cycles.

(2-4) Test for Evaluating the Rate of Occurrence of Micro-Short Circuit

Evaluation tests were performed in the following manner by using each of the batteries of Examples 1 to 14 and Comparative Examples 1 to 8. First, after chemical conversion of the battery, the battery that was charged to 20% of the denoted capacity was left in an atmosphere of 25° C. for 20 days. Then, the percentage of batteries whose voltage decreased by 0.1 V or more as a result of comparison with the battery voltage before the battery was left was calculated. More specifically, the battery was charged, from a discharged state, with a charge current of 0.5 C for 0.4 hours. After 1 hour passed after charging, the battery voltage was measured so as to obtain a battery voltage (V) before being left. After that, the battery was left in an atmosphere of 25° C. for 20 days, and thereafter the battery voltage was measured so as to obtain a battery voltage (V) after being left. Then, the batteries having a value obtained by subtracting the battery voltage (V) after being left from battery voltage (V) before being left of 0.1 V or greater were denoted as micro-short circuited batteries. In each of Examples and Comparative Examples, 20 batteries were tested, and the percentage of micro-short circuited batteries was calculated, whereby the rate of occurrence of a micro-short circuit (%) was measured.

Next, the overall air permeability of the separator, the air permeability of the base material layer of the separator, the air permeability of the coating layer, the air permeability of the interface, and the porosity of the base material layer of the separator were measured in the following manner. In each test, the average of five instances was calculated. Specifically, the average values of respective measured values of each separator sample, each being the average of five instances were respectively denoted as overall air permeability, base material layer air permeability, coating layer air permeability, interface air permeability, and base material layer porosity.

(3-1) Obtaining Separator Samples after Pre-Treatment and Measuring Each Sample

With respect to a wound battery, in respective areas at one third, two thirds, and three thirds the distance from the outer side of all turns of the positive electrode divided into three, sampling was performed at a center of a linear portion of the separator sandwiched between a positive electrode linear portion and the negative electrode located outside thereof, the positive electrode linear portion being between an arbitrary positive electrode turn in each of the areas and the next positive electrode turn. The samples were washed with DMC and then vacuum dried at room temperature, and used as separator samples after pre-treatment.

With respect to a laminated battery, in respective areas at one third, two thirds, and three thirds the distance from one side of the entirety of laminated layers (defined in the same manner as in the case of the number of turns, the direction can be any direction), sampling was performed at a center portion of an arbitrary layer in each of the areas, and the samples were washed with DMC and then vacuum dried at room temperature, and used as separator samples after pre-treatment. The sample can be any size as long as evaluation is possible, and can be set to 4 cm×4 cm if specifically requested.

With respect to each separator sample after pre-treatment, the overall air permeability Ta (sec/100 cc) of the separator sample was obtained by measuring the time during which 100 cc of air passed through a specified area by Gurely method (JIS 8119). Also, with respect to each separator sample after pre-treatment, unit area weight (weight per area) Wa (g/10 cm$^2$) was obtained.

(3-2) Obtaining Separator Samples after Ultrasonic Cleaning and Measuring Each Sample The above samples were immersed in a liquid containing water and ethanol at a ratio of 1:1 (vol %), and in this state, the immersion vessel was subjected to ultrasonic cleaning. Whether the coating layer was completely separated off by the ultrasonic cleaning was checked by surface observation using an optical microscope (×5 to ×500 magnification), and at the point in time when the separation of the coating layer was confirmed, vacuum drying was performed at room temperature for 2 hours or more. In this manner, separator samples after ultrasonic cleaning were obtained.

Each separator sample after ultrasonic cleaning was measured for air permeability Tb (sec/100 cc) and unit area weight (weight per area) Wb (g/10 cm$^2$). In this manner, base material layer air permeability Tb was obtained.

(3-3) Obtaining Separator Samples after Tape Separation and Measuring Each Sample With respect to the separator samples after pre-treatment, a mending tape was attached onto the surface having the coating layer thereon, and then peeled off according to the 180° tape separation test (JIS K 6854-2), whereby separator samples after tape separation were obtained. In the case of a separator having the coating layer on both sides thereof, the separation is carried out on both sides thereof.

Each separator sample after tape separation was measured for air permeability Tc (sec/100 cc) and unit area weight (weight per area) Wc (g/10 cm$^2$).

(3-4) Obtaining Separator Samples without the Coating Layer and Measuring Each Sample For each sample obtained in (3-3), x=(Wc−Wb)/(Wa−Wb)×100 was calculated. If x was 20 or less, the sample obtained in (3-3) was denoted as a separator sample without the coating layer. If x was greater than 20, the separation using a mending tape was again carried out on the sample obtained in (3-3), and repeated until x reached 20 or less so as to obtain a separator sample without the coating layer.

Each separator sample without the coating layer was measured for weight W per area (g/10 cm$^2$) and thickness D (μm).

(3-5) Obtaining Coating Layer Air Permeability Td

The coating layer air permeability Td (sec/100 cc) of each separator sample was calculated by the following expression: coating layer air permeability Td=(Wa−Wb)/(Wa−Wc)×(Ta−Tc). In the case of Td<0, Td=0.

dation in the battery when the positive electrode active material and the negative electrode material used in Example 1 and Comparative Example 1 were respectively changed to $LiNi_{1/3}Mn_{1/3}Co_{1/3}O_2$ and hard carbon.

The battery output, the low-rate transient degradation and the high-rate transient degradation of each of Examples and Comparative Examples shown in Table 1 are indicated by values with the values of Example 1 being set to 100.

TABLE 1

| | Overall air permeability (sec/100 cc) | Base material layer porosity (%) | Base material layer air permeability (sec/100 cc) | Coating layer air permeability (sec/100 cc) | Interface air permeability (sec/100 cc) | Battery output (%) | Low-rate transient degradation (%) | High-rate transient degradation (%) | Rate of occurrence of micro-short circuit (%) |
|---|---|---|---|---|---|---|---|---|---|
| Example 1 | 110 | 55 | 100 | 5 | 5 | 100 | 100 | 100 | 0 |
| Example 2 | 115 | 55 | 100 | 5 | 10 | 99 | 100 | 101 | 0 |
| Example 3 | 120 | 55 | 100 | 5 | 15 | 99 | 101 | 103 | 0 |
| Comparative Example 1 | 125 | 55 | 100 | 5 | 20 | 97 | 101 | 112 | 0 |
| Example 4 | 115 | 55 | 100 | 10 | 5 | 99 | 100 | 101 | 0 |
| Example 5 | 120 | 55 | 100 | 15 | 5 | 99 | 101 | 102 | 0 |
| Comparative Example 2 | 125 | 55 | 100 | 20 | 5 | 98 | 101 | 115 | 0 |
| Example 6 | 140 | 55 | 130 | 5 | 5 | 99 | 101 | 101 | 0 |
| Example 7 | 160 | 55 | 150 | 5 | 5 | 98 | 101 | 103 | 0 |
| Example 8 | 210 | 55 | 200 | 5 | 5 | 96 | 102 | 105 | 0 |
| Example 9 | 260 | 55 | 250 | 5 | 5 | 94 | 102 | 107 | 0 |
| Comparative Example 3 | 290 | 55 | 280 | 5 | 5 | 91 | 103 | 116 | 0 |
| Comparative Example 4 | 340 | 55 | 330 | 5 | 5 | 86 | 104 | 128 | 0 |
| Example 10 | 110 | 50 | 100 | 5 | 5 | 99 | 101 | 101 | 0 |
| Example 11 | 110 | 45 | 100 | 5 | 5 | 99 | 102 | 102 | 0 |
| Comparative Example 5 | 110 | 40 | 100 | 5 | 5 | 98 | 104 | 112 | 0 |
| Comparative Example 6 | 110 | 35 | 100 | 5 | 5 | 98 | 105 | 130 | 0 |
| Example 12 | 110 | 55 | 100 | 5 | 5 | 115 | 99 | 99 | 0 |
| Comparative Example 7 | 125 | 55 | 100 | 5 | 20 | 113 | 101 | 121 | 0 |
| Example 13 | 45 | 70 | 35 | 5 | 5 | 108 | 100 | 102 | 0 |
| Example 14 | 35 | 75 | 25 | 5 | 5 | 111 | 101 | 105 | 10 |
| Comparative Example 8 | 20 | 80 | 10 | — | — | 113 | 102 | 112 | 25 |

(3-6) Obtaining Interface Air Permeability Te

The interface air permeability Te (sec/100 cc) of each separator sample was calculated by the following expression: interface air permeability Te=Ta−Tb−Td. In the case of Te<0, Te=0.

(3-7) Obtaining Base Material Layer Porosity P

Each separator sample without the coating layer obtained in (3-4) was measured for the amount A of intrusion per weight (cc/g) by mercury intrusion method. Then, the base material layer porosity P (%) was calculated by the following expression: P=A/(1/W)×(D/1000)×100.

In the case of, for example, polyolefin microporous membranes, the porosity can be changed by changing the type of resin (composition ratio, molecular weight or the like), the plasticizer ratio, the elongation ratio, or heat setting conditions.

The values of the overall air permeability of the separator, the base material layer porosity, the base material layer air permeability, the coating layer air permeability, the interface air permeability, the battery output, the low-rate transient degradation, the high-rate transient degradation, and the rate of occurrence of a micro-short circuit obtained in the above-described manner are shown in Table 1 given below.

That is, the following Table 1 compares the battery output, the transient output degradation and the rate of occurrence of a micro-short circuit in the battery when the base material layer porosity, the base material layer air permeability, the coating layer air permeability and the interface air permeability are changed, among Examples 1 to 11, 13, 14 and Comparative Examples 1 to 6, and 8.

Figure 4A:
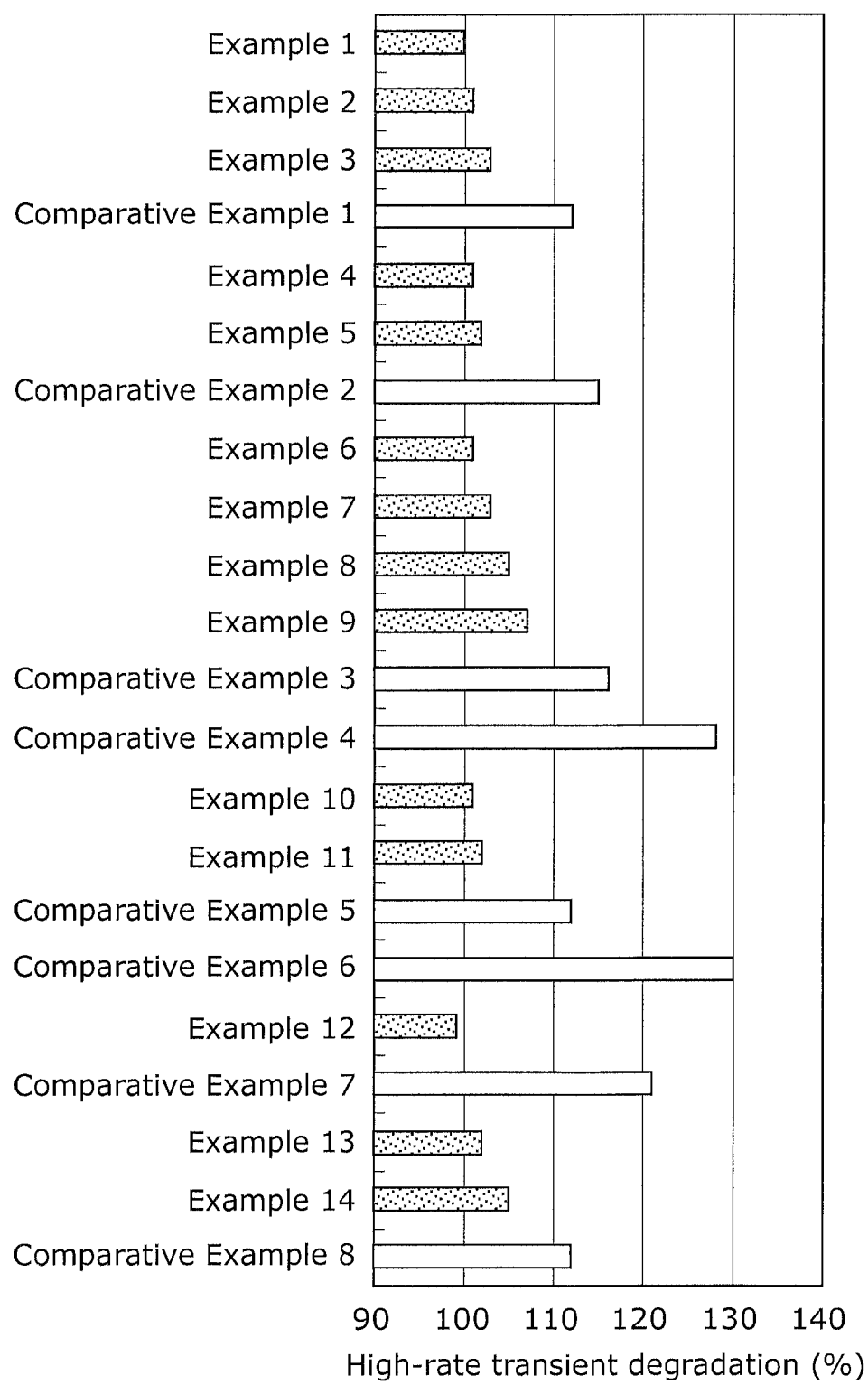
FIG. 4A is a diagram illustrating the effects achieved by energy storage devices including separators according to an embodiment of the present invention.
Figure 4B:
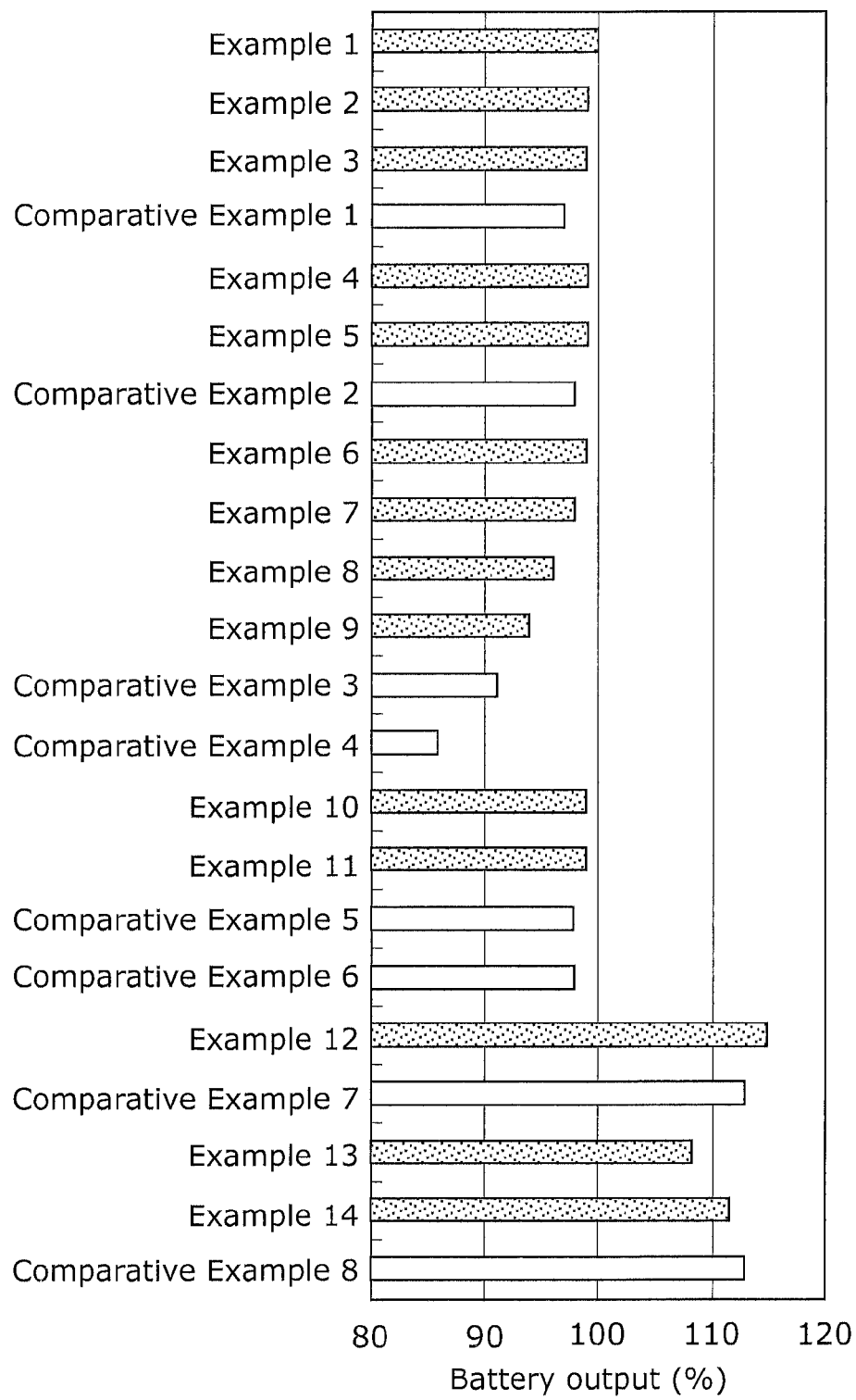
FIG. 4B is a diagram illustrating the effects achieved by energy storage devices including separators according to an embodiment of the present invention.

Example 12 and Comparative Example 7 are provided to compare the battery output and the transient output degra- Also, FIGS. 4A and 4B are diagrams illustrating the effects achieved by the energy storage devices 10 each including the separator 440 according to an embodiment of the present invention. Specifically, FIG. 4A is a graph showing values of the high-rate transient degradation of Examples and Comparative Examples shown in Table 1. Likewise, FIG. 4B is a graph showing values of the battery output of Examples and Comparative Examples shown in Table 1.

As shown in Table 1, Examples 1 to 3 and Comparative Example 1 indicate the transient output degradation in the battery when the interface air permeability was changed while the base material layer porosity, the base material layer air permeability, and the coating layer air permeability were fixed. Table 1 and FIG. 4A illustrate that when the interface air permeability is 15 (sec/100 cc) or less, the transient output degradation due to high rate cycles can be improved significantly.

Also, as shown in Table 1, Examples 4 and 5 and Comparative Example 2 indicate the transient output degradation in the battery when the coating layer air permeability was changed while the base material layer porosity, the base material layer air permeability, and the interface air permeability were fixed. Table 1 and FIG. 4A illustrate that when the coating layer air permeability is 15 (sec/100 cc) or less, the transient output degradation due to high rate cycles can be improved significantly.

Also, as shown in Table 1, Examples 6 to 9 and Comparative Examples 3 and 4 indicate the transient output degradation in the battery when the base material layer air permeability was changed while the base material layer porosity, the coating layer air permeability, and the interface air permeability were fixed. Table 1 and FIG. 4A illustrate that when the base material layer air permeability is 250 (sec/100 cc) or less, the transient output degradation due to high rate cycles can be improved significantly.

Also, as shown in Table 1, Examples 10 and 11 and Comparative Examples 5 and 6 indicate the transient output degradation in the battery when the base material layer porosity was changed while the base material layer air permeability, the coating layer air permeability, and the interface air permeability were fixed. Table 1 and FIG. 4A illustrate that when the base material layer porosity is 45% or greater, the transient output degradation due to high rate cycles can be improved significantly.

Also, as shown in Table 1, Example 12 and Comparative Example 7 indicate the battery output and the transient output degradation in the battery when the positive electrode active material and the negative electrode active material used in Example 1 and Comparative Example 1 were respectively changed to $LiNi_{1/3}Mn_{1/3}Co_{1/3}O_2$ and hard carbon. Table 1 and FIG. 4A illustrate that in Comparative Example 7, the transient output degradation was more significant than that of Comparative Example 1. Also, Table 1 and FIG. 4B illustrate that in Example 12 and Comparative Example 7, the battery output increased significantly as compared with Example 1 and Comparative Example 1, respectively. Also, Table 1 and FIG. 4A illustrate that, in Example 12, the transient output degradation improved more significantly, as compared with Example 1.

Also, as shown in Table 1, Examples 13 and 14 and Comparative Example 8 indicate the battery output, the transient output degradation in the battery and the rate of occurrence of a micro-short circuit when the base material layer air permeability was changed while the coating layer air permeability, and the interface air permeability were fixed. In Comparative Example 8, the tape separation test specified in (3-3) above was performed, but the base material layer was broken when the tape was peeled off and therefore it was not possible to measure the air permeability Tc. For this reason, in Table 1, the sign "-" is written in the column "coating layer air permeability" and the column "interface air permeability".

Table 1 and FIG. 4A illustrate that when the base material layer air permeability is 25 (sec/100 cc) or greater, the transient output degradation due to high-rate cycles can be improved significantly, and when the base material layer air permeability is 35 (sec/100 cc) or greater, the transient output degradation can be further improved. Also, Table 1 and FIG. 4B illustrate that in Examples 13 and 14, the battery output increased significantly as compared with Example 1. Also, Table 1 illustrates that when the base material layer air permeability is 35 (sec/100 cc) or greater, the rate of occurrence of a micro-short circuit can be suppressed.

As described above, the energy storage device 10 according to an embodiment of the present invention includes a separator 430 having a base material layer 431 and a coating layer 432, wherein the separator 430 has an air permeability of the base material layer 431 of 25 (sec/100 cc) or greater and 250 (sec/100 cc) or less, a porosity of the base material layer 431 of 45% or greater, an air permeability of an interface 433 between the base material layer 431 ad the coating layer 432 of 15 (sec/100 cc) or less, and an air permeability of the coating layer 432 of 15 (sec/100 cc) or less. In other words, the present inventors found, as a result of intensive research, that in order to significantly improve the transient output degradation in the energy storage device 10 including the separator 430 having the base material layer 431 and the coating layer 432, it is necessary to reduce the air permeabilities of the base material layer 431 and the coating layer 432, and at the same time, it is necessary to reduce the air permeability of the interface 433 as well as increasing the porosity of the base material layer 431. Specifically, the present inventors found, as a result of intensive experiments, that when the air permeability of the base material layer 431 is 25 (sec/100 cc) or greater and 250 (sec/100 cc) or less, the porosity of the base material layer 431 is 45% or greater, the air permeability of the interface 433 between the base material layer 431 and the coating layer 432 is 15 (sec/100 cc) or less, and the air permeability of the coating layer 432 is 15 (sec/100 cc) or less, the partial inhibition of ion migration is unlikely to occur, and the transient output degradation in the energy storage device 10 can be improved significantly. Accordingly, with the use of the energy storage device including the multilayer structured separator 430, the transient output degradation can be improved significantly. In particular, with the energy storage device 10, transient output degradation due to high-rate cycles can be improved significantly.

Also, the present inventors found, as a result of intensive research, that in the energy storage device 10, when the base material layer 431 has an air permeability of 35 (sec/100 cc) or greater, the transient output degradation can be further improved and the occurrence of a micro-short circuit can be suppressed. Therefore, with the use of the energy storage device 10, the transient output degradation can be improved significantly while the occurrence of a micro-short circuit is suppressed.

It is preferable that the coating layer 432 has an air permeability of 1 (sec/100 cc) or greater. This is because if the air permeability of the coating layer 432 is less than 1 (sec/100 cc), the strength of the coating layer 432 against physical scratching or the like is reduced, as compared with the case where the coating layer 432 has an air permeability of 1 (sec/100 cc) or greater.

Also, it is preferable that the interface 433 between the base material layer 431 and the coating layer 432 has an air permeability of 1 (sec/100 cc) or greater. This is because if the air permeability of the interface 433 is less than 1 (sec/100 cc), adhesion between the base material layer 431 and the coating layer 432 is partially reduced, as compared with the case where the air permeability of the interface 433 is 1 (sec/100 cc) or greater.

Also, the energy storage device 10 includes a compound represented by $Li_aNi_bM1_cM2_dW_xNb_yZr_zO_2$ that satisfies a predetermined condition as a positive electrode active material, and hard carbon as a negative electrode active material. Here, as a result of intensive research and experiments, the present inventors succeeded in significantly increasing capacity and output by using the above positive electrode active material, the above negative electrode active material, and a multilayer structured separator, but also found a problem in that the degree of transient output degradation after high-rate cycles becomes more apparent. And, as a result of further research, they found that by using the above positive electrode active material, the above negative electrode active material, and a separator having an air permeability and a porosity within the above ranges, the output can be significantly increased and the transient output degradation after high-rate cycles can be improved more noticeably. Therefore, with the use of the energy storage device including such a multilayer structured separator, it is possible to increase the output significantly and improve the transient output degradation more noticeably.

Note that the present invention can be embodied not only as an energy storage device 10 as described above, but also as a separator 430 provided in the energy storage device 10.

The energy storage device 10 according to an embodiment of the present invention has been described above, but the present invention is not limited to this embodiment.

That is, the embodiments disclosed herein are all considered in all respects as illustrative and not restrictive. The scope of the present invention is indicated by the appended claims rather than the foregoing description, and all modifications or changes that come within the meaning and range of equivalency of the claims are intended to be embraced therein.

The invention claimed is:

1. An energy storage device comprising a positive electrode and a negative electrode that are insulated from each other with a separator interposed therebetween, and a non-aqueous electrolyte, wherein the separator includes a base material layer and a coating layer that is disposed on at least one surface of the base material layer, the separator has an air permeability of the base material layer of 25 (sec/100 cc) or greater and 250 (sec/100 cc) or less, an air permeability of an interface between the base material layer and the coating layer of 1 (sec/100 cc) or greater and 15 (sec/100 cc) or less, and an air permeability of the coating layer of 15 (sec/100 cc) or less, the coating layer is a heat resistant coating layer containing inorganic particles as heat resistant particles, and the base material layer is a microporous membrane and a porosity of the base material layer is 45% or greater.

2. The energy storage device according to claim 1, wherein the separator has an air permeability of the base material layer of 35 to 250 (sec/100 cc).

3. The energy storage device according to claim 1, wherein the positive electrode includes, as a positive electrode active material, a compound represented by $Li_aNi_bM1_cM2_dW_xNb_yZr_zO_2$, where a, b, c, d, x, y, and z satisfy $0 \leq a \leq 1.2$, $0 \leq b \leq 1$, $0 \leq c \leq 0.5$, $0 \leq d \leq 0.5$, $0 \leq x \leq 0.1$, $0 \leq y \leq 0.1$, $0 \leq z \leq 0.1$, and $b+c+d=1$; and M1 and M2 are each at least one element selected from the group consisting of Mn, Ti, Cr, Fe, Co, Cu, Zn, Al, Ge, Sn, Mg, and Zr, and satisfy $M1 \neq M2$, and the negative electrode includes hard carbon as a negative electrode active material.

4. The energy storage device according to claim 1, wherein in the coating layer, a proportion of the heat resistant particles is substantially the same between a base material layer-side half and a surface-side half.

5. The energy storage device according to claim 1, wherein the separator has an air permeability of the coating layer of 1 to 15 (sec/100 cc).

6. The energy storage device according to claim 1, wherein the base material layer comprises a first resin;

the heat resistant coating layer comprises a second resin; and a softening point of the second resin is higher than a softening point of the first resin.

7. The energy storage device according to claim 6, wherein the second resin is polyimide or melamine resin.

8. The energy storage device according to claim 1, wherein the inorganic particles comprise:

conductive particles, and electrically insulating material at surfaces of the conductive particles.

9. The energy storage device according to claim 8, wherein the conductive particles comprise oxide particles or carbonaceous particles.

10. The energy storage device according to claim 9, wherein the oxide particles comprise $SnO_2$ particles or indium-tin oxide particles.

11. The energy storage device according to claim 9, wherein the carbonaceous particles comprise carbon black particles or graphite particles.

* * * * *